United States Patent
Dev et al.

(10) Patent No.: US 6,216,168 B1
(45) Date of Patent: *Apr. 10, 2001

(54) PERSPECTIVE-BASED SHARED SCOPE ADDRESS RESOLUTION METHOD AND APPARATUS

(75) Inventors: Roger Dev, Durham; Jason Jeffords; Martin S. Quinn, both of Lee, all of NH (US)

(73) Assignee: Cabletron Systems, Inc., Rochester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,522

(22) Filed: Mar. 17, 1997

(51) Int. Cl.[7] .................................................. G06F 13/00
(52) U.S. Cl. ............................. 709/245; 709/206; 709/230
(58) Field of Search .................................. 395/400, 417; 370/13, 85.13, 392; 709/24, 116, 129, 132, 103, 224, 173, 226, 200, 245, 230, 206; 707/100; 382/49; 711/207; 703/25

(56) References Cited

U.S. PATENT DOCUMENTS

| | | | |
|---|---|---|---|
| 5,146,571 | * | 9/1992 | Logan ................................. 395/400 |
| 5,280,547 | * | 1/1994 | Mahoney ............................... 382/49 |
| 5,420,862 | * | 5/1995 | Perlman .............................. 370/85.13 |
| 5,425,028 | * | 6/1995 | Britton et al. ....................... 370/94.1 |
| 5,664,185 | | 9/1997 | Landfield et al. .................... 395/615 |
| 5,696,927 | * | 12/1997 | MacDonald et al. ................ 395/417 |
| 5,710,908 | * | 1/1998 | Man ..................................... 709/230 |
| 5,761,664 | * | 6/1998 | Sayah et al. ......................... 707/100 |
| 5,790,804 | * | 8/1998 | Osborne .............................. 709/245 |
| 5,822,526 | * | 10/1998 | Waskiewicz ......................... 709/206 |
| 5,835,723 | * | 11/1999 | Andrews et al. .................... 709/226 |
| 5,845,118 | * | 12/1998 | Gheith ................................. 709/173 |
| 5,856,974 | * | 1/1999 | Gervais et al. ...................... 370/392 |
| 5,983,270 | * | 11/1999 | Abraham et al. ................... 709/224 |

OTHER PUBLICATIONS

Routing on Longest–Matching Prefixes. Doering et al. IEEEVI 4 ,No. 1, Feb. 1996.*

* cited by examiner

Primary Examiner—Robert B. Harrell
Assistant Examiner—Thong Vu
(74) Attorney, Agent, or Firm—Wolf, Greenfield & Sacks (57) ABSTRACT

A network system includes a hierarchical directory which includes a plurality of nodes in a tree structure. Each node contains a set of address mappings relating a first address to a second address. An address resolution request attempts to resolve a first address to a target address in a node in which the first address is located. If the resolution of this first address cannot be accomplished in this first node, the process moves to a next higher node in the hierarchy and again attempts to resolve the request. The address mappings become less specific as the process moves up the hierarchy and, as a result, more general addresses will be used to resolve the first address to the target address.

26 Claims, 9 Drawing Sheets

Directory Prefix Mappings

PERSPECTIVE-BASED SHARED SCOPE ADDRESS RESOLUTION METHOD AND APPARATUS

BACKGROUND OF THE INVENTION

1. Field of the Invention

This invention relates to a method and apparatus for address mapping and resolution in a communications network, and more particularly to a method and apparatus wherein network mappings that are more specific from the requesting entity's point of view, perspective of the network, are used before network mappings that are less specific relative to the requesting entity.

2. Discussion of the Related Art

Resources in a network are located and manipulated according to their associated network addresses. These resources may be hardware and/or software, including physical devices (routers, hubs, end stations, processors, components of larger physical entities, etc.) and processes. Any one resource may have a number of different types of network addresses. Each type may be used by a different network protocol to sustain that protocol's operation. The different network addresses for a particular resource are referred to as "aliases".

An alias can also be considered a mapping from one set, consisting of an address type and an associated value, to another set, of a different address type and associated value. For example, a resource may have an IP (Internet Protocol) address as well as a MAC (Media Access Control) address. In an application, it is useful to consider that the IP address maps to the MAC address and that one address type can be resolved to another address type, as long as a mapping is set up beforehand. To find a related MAC address of a known IP resource, the address mapping of the known IP address can be resolved to its MAC type, thereby obtaining its MAC value. The MAC value can then be used by the requesting resource (application).

Because of their importance to the overall operation of a network, there is an ongoing need for more efficient mapping techniques for resolving addresses.

SUMMARY OF THE INVENTION

According to the present invention, address mapping for end-stations and their associated processes are resolved as a function of a requesting end-station's network perspective. A relationship between one address and another is first established within a hierarchical directory, i.e., a tree structure. When an end-station desires to connect to a target end-station or resource, the tree structure is searched, starting at the lowest scope (level), i.e., the level at which the requesting end-station is located.

In one embodiment of the present invention, a system resolves a first address type and value to a target address type and value in a network. The system includes a computer-readable medium encoded with a data structure, including a hierarchical directory (tree structure) having a plurality of nodes, where each node represents a hierarchical level within the network and defines the address mappings. Further included on the computer-readable medium is a plurality of executable methods (processes) including a method for resolving the first address type and value to the target address type and value in a first node at a first hierarchical level.

Another embodiment is a method of resolving a first address type and value to a target address type and value, including the steps of: starting at the first node, resolving the first address type and value to the target address type and value according to a mapping set and when the first address type and value cannot be resolved to the target address type, resolving the first address type and value to the target address type and value in a second node at a second hierarchical level higher than the first hierarchical level.

These and other features and benefits of the present invention will be more particularly described with the following detailed description.

DETAILED DESCRIPTION OF THE INVENTION

In order to determine a relationship between one address and another, there must be first established some representation of this relationship. In other words, one address must be "mapped" to another. Without such a mapping, the routing of messages from one resource to another could fail. In the present invention, the mapping of a first address to a target address will depend on the location of the first address in the network. Therefore, if two different (first) addresses at two different locations in the network need to communicate with the same target address, the mappings from each of the two addresses to the target address could be different.

Figure 1:
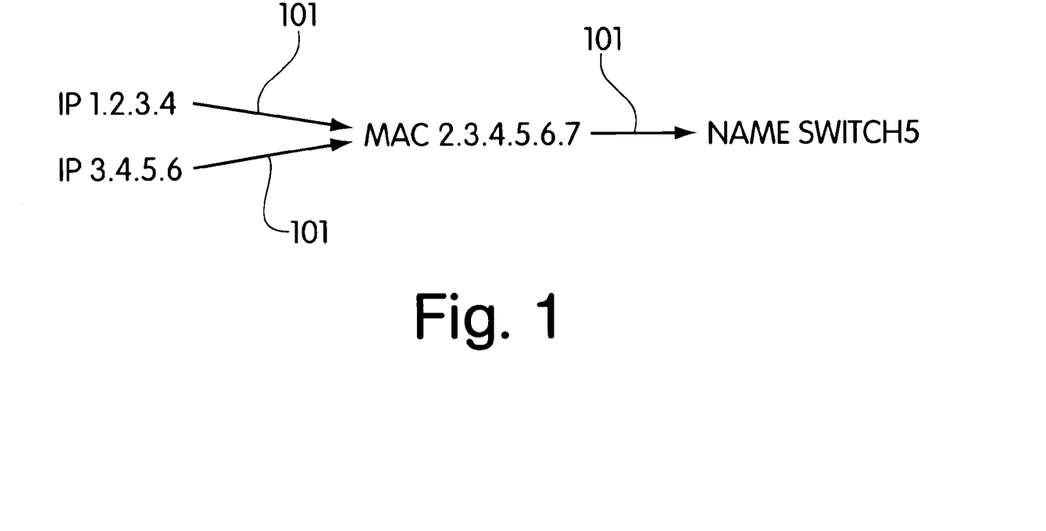
FIG. 1 is a representation of an address mapping.

In FIG. 1, the direction of mapping is signified by arrows 101. As can be seen, a series of addresses are mapped, e.g., address IP 1.2.3.4 to address MAC 2.3.4.5.6.7 to address NAME SWITCH5. A NAME is just another type of binding, and as such its significance is minimal. In this context, NAME is a symbolic identifier used to store and lookup other attributes of a network device within the topology subsystem of Cabletron's Virtual Network Services (VNS) available from Cabletron Systems, Inc., Rochester, N.H., U.S.A. While these attributes are not stored in the directory, the mapping of the actual network address to its NAME identifier that this identifier represents is within the directory and enables one to resolve to the NAME using those network addresses; hence, the other attributes of this device can be retrieved from other software using the resolved to NAME.

The present invention also allows more than one address to map to the same address. As shown, address IP 3.4.5.6 also maps to address MAC 2.3.4.5.6.7. The mappings, as shown in FIG. 1, represent a directory "scope" (or level) and within a directory scope an address can be resolved from a known type and value to another value, given a target type.

As an example, consider a resolution request from either IP 1.2.3.4 or IP 3.4.5.6 to a type NAME. Each resolution, according to the mapping shown in FIG. 1, would return NAME SWITCH5, after an intermediate resolution to MAC 2.3.4.5.6.7. In this example, the MAC address is not the desired type, so the search continues along the mapping series (scope) until successfully resolved or terminated. In addition, a resolution request using MAC 2.3.4.5.6.7 to type NAME would also return NAME SWITCH5. On the other hand, a desired resolution, starting at type NAME to a target type of MAC would fail since the direction of mappings 101 determines the direction of resolution. Since the NAME address has no mappings out of it, i.e., there are no mapping arrows, it cannot be resolved to any other address in this scope.

Whenever an address cannot be found in its complete form in a given scope, a shorter version of it may be searched for. This extra search is dependent upon whether the address is of a type that supports prefixing. As an example, MAC addresses do not support prefixing whereas IP addresses do. A prefix is used to decrease the number of mappings required in a scope and to indicate that all addresses in a particular range (i.e., designated by upper and lower) map to the same value. In the method of the present invention, the longest matching prefix, i.e., the more specific address, is used before any shorter prefix, i.e., less specific, addresses are used.

Figure 2:
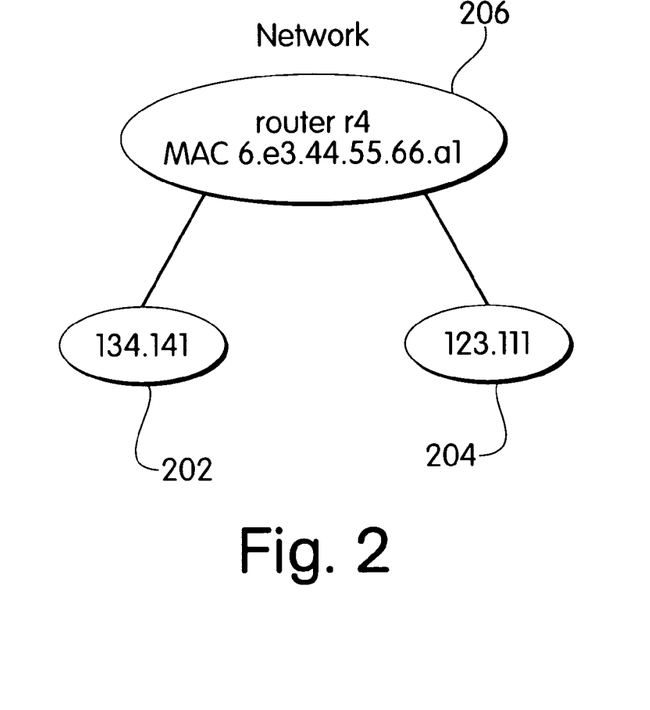
FIG. 2 is a schematic diagram of a network.

As shown in FIG. 2, two IP subnetworks 202, 204 are separated by a router 206. The MAC address of the router 206 is 6.e3.44.55.66.a1. In order to make connections across the subnetwork boundary, each subnetwork 202, 204 has to route messages as if they were destined for the router 206. Each subnetwork can be identified by its respective IP prefix. As shown, subnetwork 202 has an IP prefix of 134.141 and subnetwork 204 has an IP prefix of 123.111. Any substations on the subnet 202 can connect to any substations on the subnet 204 by going through the router 206 and vice-versa. As a result, the subnet 202 directory scope will have a mapping from IP 123.111 to MAC 6.e3.44.55.66.a1, and the subnetwork 204 directory scope will have a mapping from IP 134.141 to MAC 6.e3.44.55.66.a1.

Figure 3:
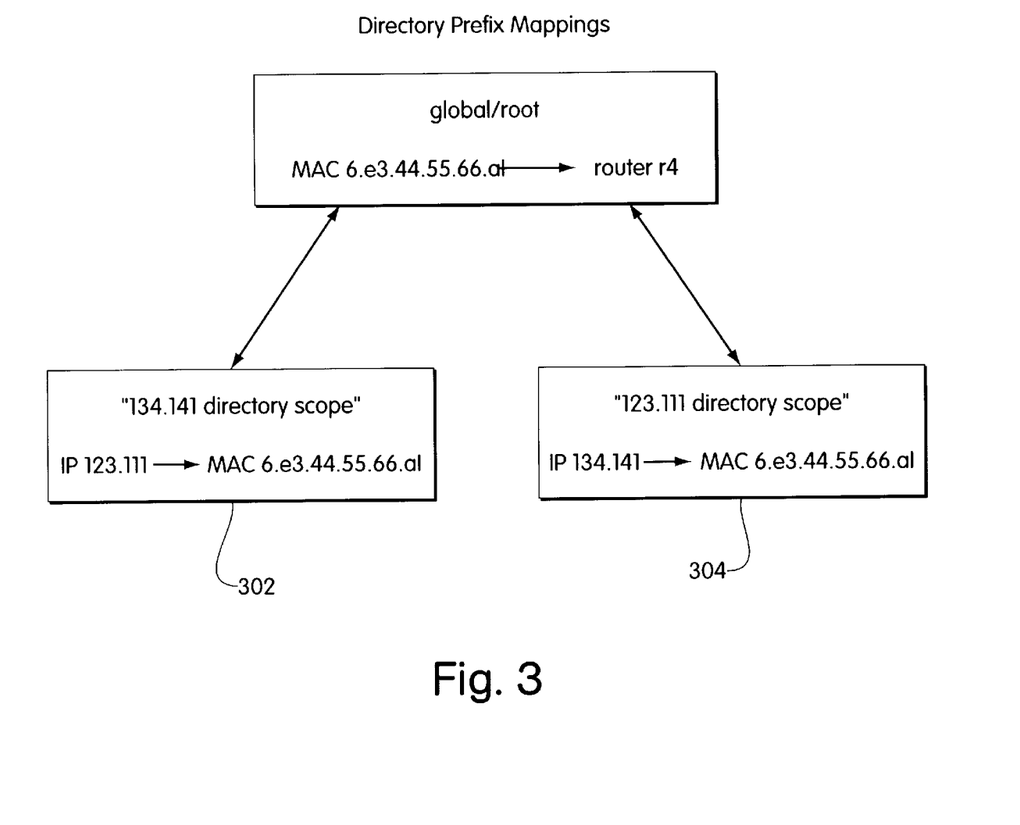
FIG. 3 is a diagram showing the address mappings for the network of FIG. 2.

The mappings for the directory scopes associated with subnetworks 202, 204 are shown in FIG. 3. If a resolution request is performed in subnetwork 202 to resolve, for example, address IP 123.111.34.54 to a MAC address, it can be seen that no IP 123.111.34.54 alias exists in the directory scope 302 associated with subnetwork 202. As a result, the next shorter prefix of the IP address will be searched. The next shorter prefix alias is IP 123.111.34 and it does not have an alias in the directory scope 302, either. So, the next shorter prefix IP 123.111 will be searched. There is a prefix alias for IP 123.111 and its mapping series is searched for the target MAC type. The MAC value that will be returned is the MAC address value of the router 206, i.e., 6.e3.44.55.66.a1, as represented in the directory scope 302. As can be seen in FIG. 3, a similar prefix mapping is set up in the directory scope 304 associated with the subnetwork 204 indicating that address type IP, value 134.141.xx.xx is mapped to resolve to the MAC address of the router 206.

The present invention thus defines a hierarchical directory (tree structure) consisting of a plurality of hierarchically related nodes with each node containing a set of address mappings. A node is defined as a directory scope. In the present invention, a scope at a lower level of the hierarchical tree defines address mappings that relate to more specific mappings, i.e., a subset of the network resources. In operation, a more specific mapping may override a mapping higher in the directory tree structure, i.e., a more general mapping. The entire hierarchical directory (tree structure) represents all relevant address mapping information for a particular network. The tree structure and address mappings are stored in a software structure known as Directory Services. It uses object-oriented database technology to persist the data, and object-oriented methodology to represent and perform operations on the address mappings. It is accessed through an API (application programming interface) that provides the functionality as shown below in Table I:

TABLE I

- add mappings - a mapping will be added to a specified directory scope; the directory scope of the mapping will be created if it does not already exist; mappings are overwritten.
- resolve mapping - resolve from one address to an address of a specified type.
- remove mappings - the mapping is removed from the specified scope if it exists; a wild card remove is provided to remove whatever a particular address maps to.
- search mappings - return a set of specified types of mappings.
- add directory - a directory of the specified scope will be added if it does not already exist.
- remove directory - the specified directory and all its mappings and children directories will be removed.
- move directory - move a directory to become a child of another directory.
- rename directory - renames a directory.
- insert directory - insert a directory between a target directory and its child directories.
- search directory - return the child directory scope identifiers.

In one embodiment of the present invention, user end-station mappings may be contained in a scope associated with a particular switch to which the user end-stations connect, i.e., a "switch" scope. In another embodiment, a mapping may be used to determine which server an end-station connects to for a particular application or resource.

As an example, at a particular switch scope, a mapping may define that all end-stations connected to the particular switch use SERVER X to connect to a particular application. At the scopes associated with the end-stations, most do not define an individual SERVER mapping. Rather, the end-stations will use the SERVER X mapping at the switch's scope. In the scope for one end-station Q, however, a mapping may be set to use SERVER Y for the particular application. It should be noted that the application is not represented in the hierarchy. An application such as VNS (Virtual Network Services) uses Directory Services to determine the entry point into or exit point out of a network for a particular end-station when connections are being setup. When end-station Q seeks to resolve to its SERVER type address for the particular application, it would get Y as a result. In order to find this mapping for end-station Q, however, the resolve request would have to supply the scope of end station Q. An end station or user may have unique mappings defined for it due to any number of administrative, priority or security needs. When all of the other end-stations resolve to the SERVER type for the particular application, they would get X returned as a result.

Different end-stations may have different address views (perspectives) of network resources. It is necessary to have different address views at different times to allow shared resources. In particular, these shared resources may be accessed through one address while in one location; however, while in another location, a different address will be necessary in order to access the shared resource correctly. Sometimes a device will have two or more physical addresses to which other devices will connect. It may also have multiple logical addresses or alias names by which it can be referenced and accessed. If the same address were to be used by both end-stations, one of them would not be able to locate the resource correctly, thereby possibly causing a network or a connection failure. If a device uses an incorrect address in a communication protocol, the message will not be delivered. Depending on the device sending the incorrect address, this could result in network failure.

The address mappings are added to the hierarchical directory (tree structure) by specifying two items: 1) the scope or level at which the address mapping is to be stored, and 2) the mapping to be added. The scope takes the form of a hierarchical address called a "distinguished name," e.g., "durham," that contains at least one mapping term. The mapping term takes the form of a pair of address tuples, referred to, for convenience and ease of understanding, as an rhs tuple and an lhs tuple where "rhs" represents "right-hand side" and "lhs" represents "left-hand side." The lhs tuple maps to the rhs tuple, i.e., maps from left to right, and each tuple consists of an address type and an address value of the form (type, value). The rhs tuple can be used as the lhs tuple of a subsequent mapping, thereby creating a series of mappings. In other words, a first (lhs) tuple is mapped to a target (rhs) tuple.

According to the present invention, a new mapping resolution method is provided whereby an initial scope of the requestor is the starting point for alias resolution. When the lhs alias for the requestor's address is found within the requestor's scope, the series of address mappings are searched, looking for the desired type. If the desired type is not found in the initial scope, then a next higher scope in the hierarchical directory (tree structure) is searched using the last alias that was searched for or that was partially resolved to. The method of the present invention requires that lower hierarchical level scopes be searched before higher hierarchical level scopes are searched. As a result, if a mapping at a higher scope partially resolves an alias, i.e., the alias type is not the target alias type, the search returns to the original scope. This is done because the local (lower level) scope may contain a more specific mapping for that alias and the present invention is directed to insuring that the resolution occurs at the lowest possible hierarchical level. The process of searching the next higher hierarchical scope level is repeated either until the target alias type is found or there is no resolution. A failure to resolve can occur when the root (the "top level") of the hierarchical directory tree structure is reached and there has been no resolution, i.e., the target type has not been found, or the process has reached a search threshold limit preventing the further searching of higher hierarchical scopes.

Figure 4:
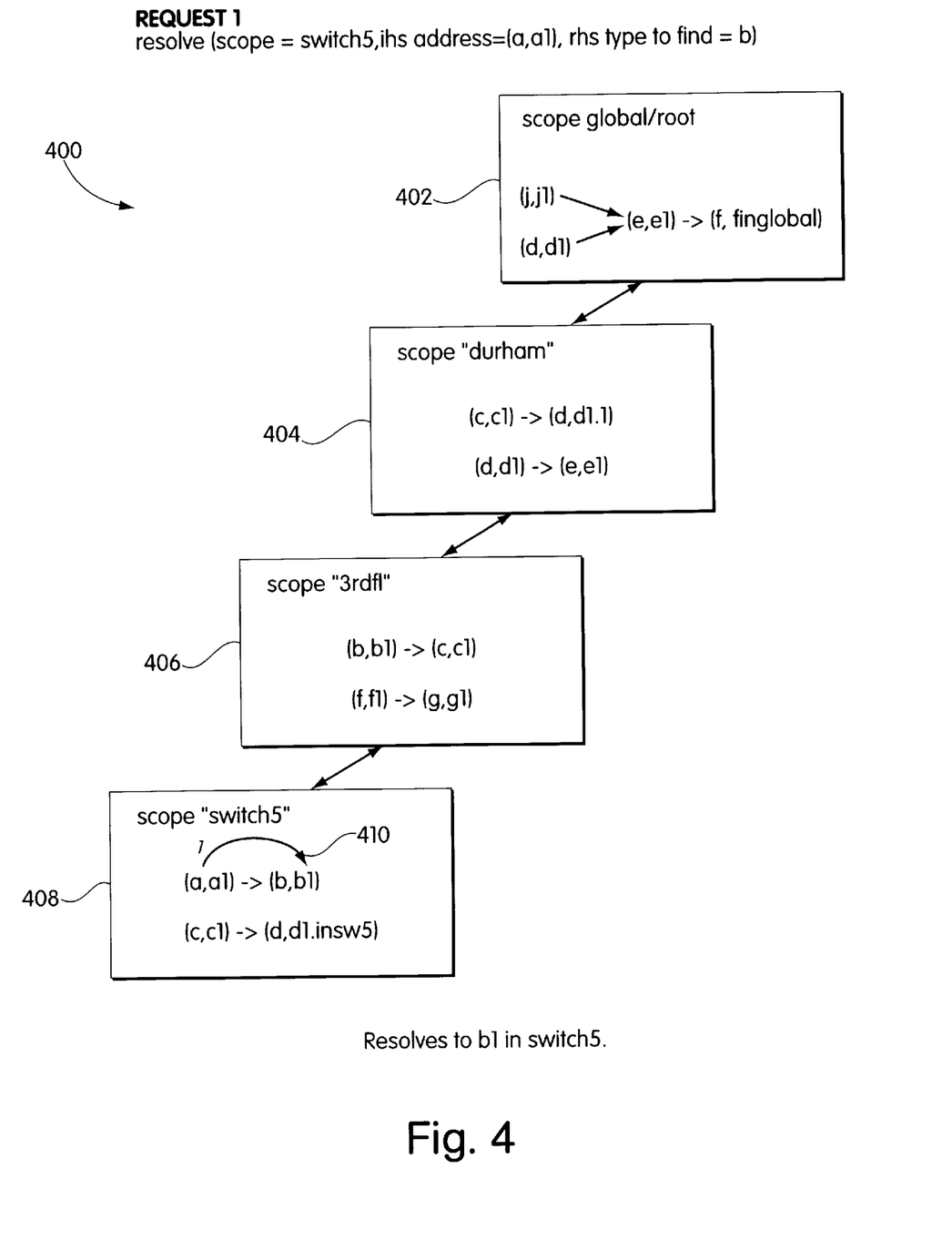
FIGS. 4–8 are flowcharts representing steps performed in resolving address resolution requests in a network according to the present invention.

In operation, the method of the present invention resolves a tuple of the form (type, value) to a target address type. As above, each resolution request starts in a particular directory scope. As shown in FIG. 4, a hierarchical directory (tree structure) 400 includes a "global/root" scope 402 with a "durham" scope 404 subordinate (at a lower level) to the scope 402, a "3rdfl" scope 406 subordinate to scope 404, and a "switch5" scope 408 subordinate to scope 406. In other words, each scope, as one proceeds down the hierarchical tree, i.e., from "top" to "bottom," becomes more specific. Each of the scopes 402–408 includes at least one mapping of a tuple having the form (type1, value1) mapped, as represented by an arrow, to another tuple (type2, value2).

The hierarchical directory (tree structure) relates directly to the hierarchical structure of the particular network. Referring to FIG. 4, which will be discussed in more detail below, the tree structure 400 represents the actual network where the "global/root" is the uppermost ("top") level of the network. At a next lower level is the "durham" level which has below it, a "3rdfl" level which is above a "switch5" level. In the example of FIG. 4, "3rdfl" means the third floor, and durham means the town Durham. Each represents a network location group identifier that could be used to store related network addresses for devices in that location. This location, which can be defined to be either physical or logical, is defined as a concatenation of single word terms. Durham, 3rdfl, represents a particular scope "3rdfl" whose parent scope is "Durham." Identifiers like these specify the hierarchial structure of the directory tree structure. The full identifier is defined from the root of the tree, i.e., the global scope, down to a specified scope as its Distinguished Name (DN). As can be seen, the detail of the network becomes more specific as one proceeds down the hierarchical levels. The address mappings within each node are specific to that hierarchical level of the network.

When it is desired that a resolution from a first resource, as represented by a lhs tuple, to a target type, or rhs tuple, be found, a command or resolution request in the form of, for example, resolve (scope=switch5, lhs address=(a, a1), rhs type to find=b) (1)

will be executed.

In the example, the command "resolve" is interpreted as follows: 1) starting from the scope of switch5, 2) find the alias for the lhs address tuple=(a, a1) mapped to a rhs address tuple with a type equal to "b". Starting at the "switch5" scope 408, the mappings within the scope 408 are checked to see if there is an alias for the lhs address of (a, a1). In the directory tree 400 as shown in FIG. 4, the "switch5" scope 408 includes such an alias for (a, a1) with the desired rhs type, in this case "b". As a result, in step 410, the address of (a, a1) resolves to a type b with a value of b1 in "switch5."

Figure 5:
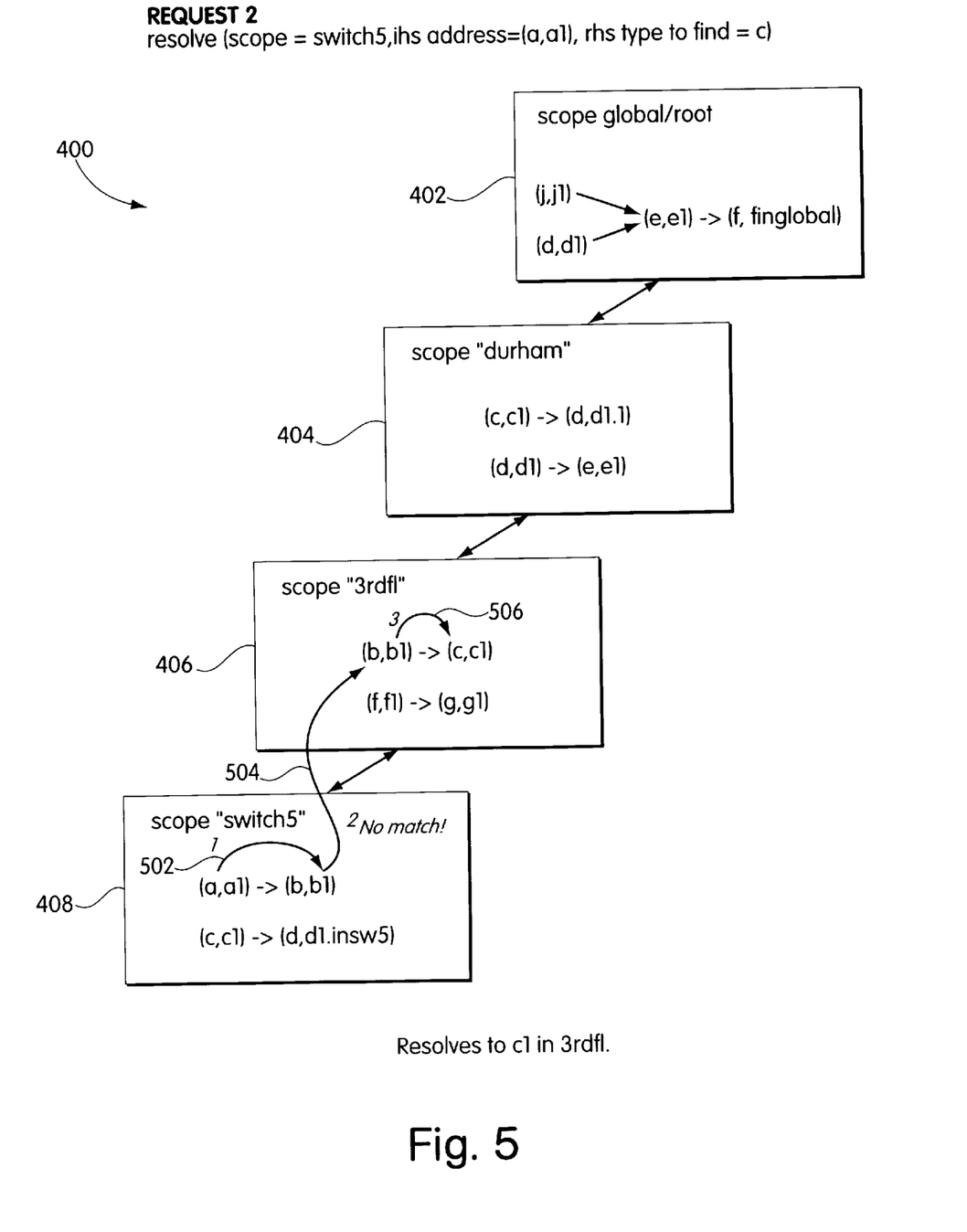

In some instances, e.g., in a specific scope, the alias may not have a mapping to the desired type. In that case, the target type will be searched for in the next higher hierarchical level. Consider the resolution request:

resolve (scope=switch5, lhs address=(a, a1), rhs type to find=c) (2)

as shown in FIG. 5. The hierarchical directory (tree structure) 400 is the same as the one shown in FIG. 4. The pending request starts at the "switch5" scope 408, attempting to find the alias (a, a1) matched to a type "c". There is, however, no match for the tuple (a, a1) to a type "c" in the "switch5" scope 408. There is, on the other hand, an alias for the tuple (a, a1) mapped to the tuple (b, b1). So, step 502 is performed, resolving (a, a1) to (b, b1), where (b, b1) becomes an intermediate lhs tuple. Since the desired type "c" is not found in the scope of the entity requesting the resolution, i.e., "switch5", at step 504, the next higher level, "3rdfl" scope 406, is searched. At this scope level, the method of the present invention looks to resolve the intermediate tuple (b, b1) to a tuple having a type of "c". In the example shown in FIG. 5, there is a mapping for this tuple and therefore the address tuple (a, a1) in "switch5" scope 408 resolves to address tuple (c, c1) in the "3rdfl" scope 406, in step 506.

The method of the present invention endeavors to resolve the desired address at the lowest possible hierarchical level. In some cases, this involves going from a lower hierarchical level to a higher hierarchical level, and then back to a lower hierarchical level. Consider the following resolution request:

resolve (scope=switch5, lhs address=(a, a1), rhs type to find=d).(3)

Figure 6:
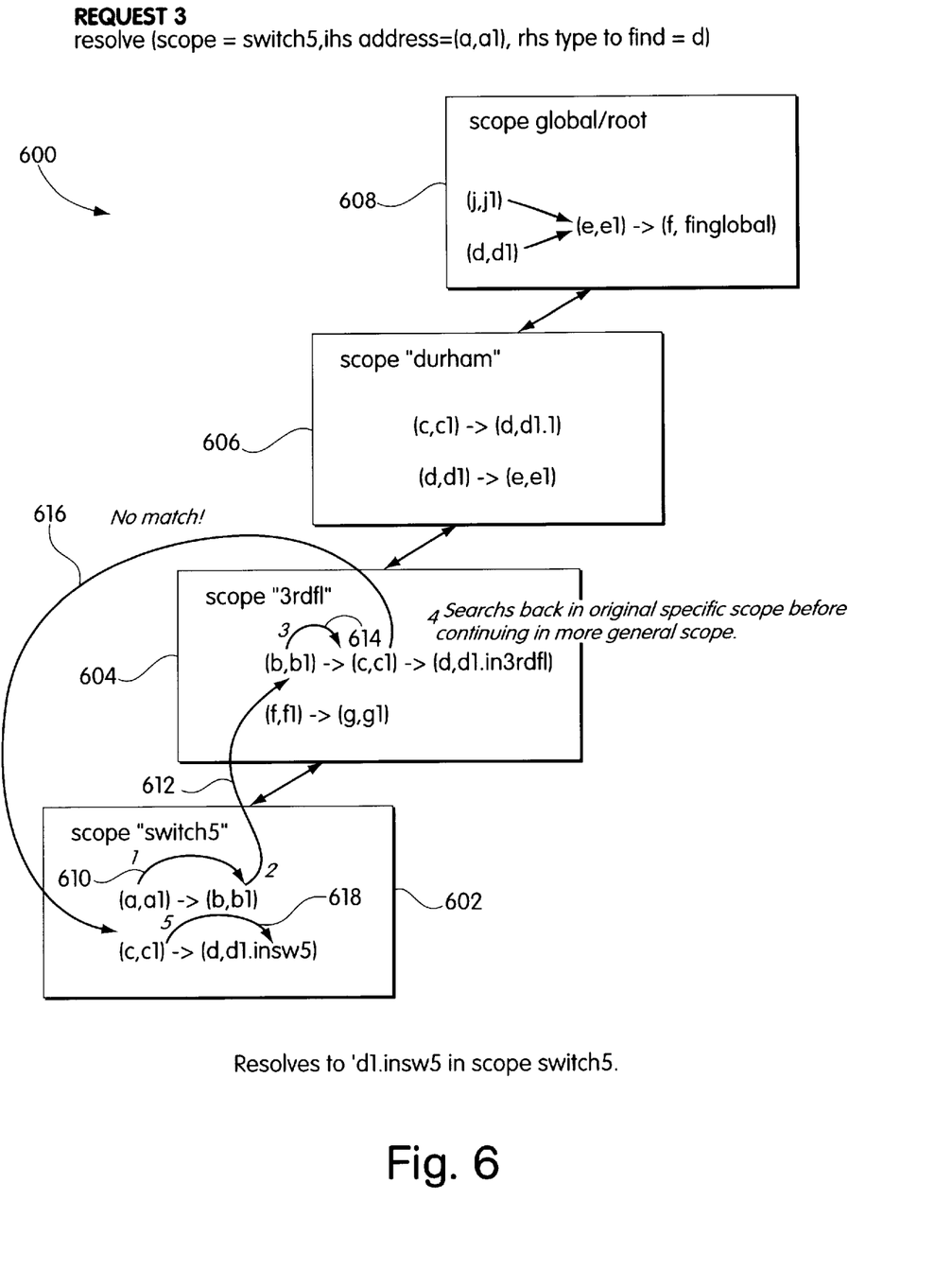

The above request is implemented, as shown in FIG. 6, in the hierarchical network 600 including scopes 602–608. As above, each of these scopes includes at least one address mapping. Starting in "switch5" scope 602 there is no mapping of the address (a, a1) to a type "d" in "switch5" scope 602. There is, however, a mapping to the address tuple (b, b1). In step 610 address (a, a1) is resolved to address (b, b1) which becomes an "intermediate" lhs tuple. The process goes up in the hierarchy when it cannot resolve any further in a particular scope. Step 612 moves to the next higher scope, "3rdfl" scope 604, where there is a mapping of the intermediate tuple (b, b1) to the address (c, c1). So, in step 614, address (b, b1) is resolved to tuple (c, c1) and this becomes the "intermediate" lhs tuple. At this point, however, the search goes back, step 616, to the original specific scope, i.e., "switch5" to resolve the intermediate address (c, c1) in order to find an address with type "d". Note that the resolution does not continue from (c, c1) to (d, d1.in3rdfl). There is only one resolution per scope. The process returns to the original scope upon any partial resolution in a higher scope (rather than continuing along the series of the more general higher scope). As shown in "switch5" scope 602 there is a mapping of (c, c1) to (d, d1.insw5). In step 618, intermediate tuple (c, c1) is resolved to tuple (d, d1.insw5). As a final result, the address (a, a1) resolves to a "d" type with a value of "d1.insw5" in scope "switch5".

In the present method, the use of prefixes can help to resolve an address resolution request. Consider, therefore, the resolution request:

resolve (scope=switch5, lhs address=(a, a1), rhs type to find=e). (4)

Figure 7:
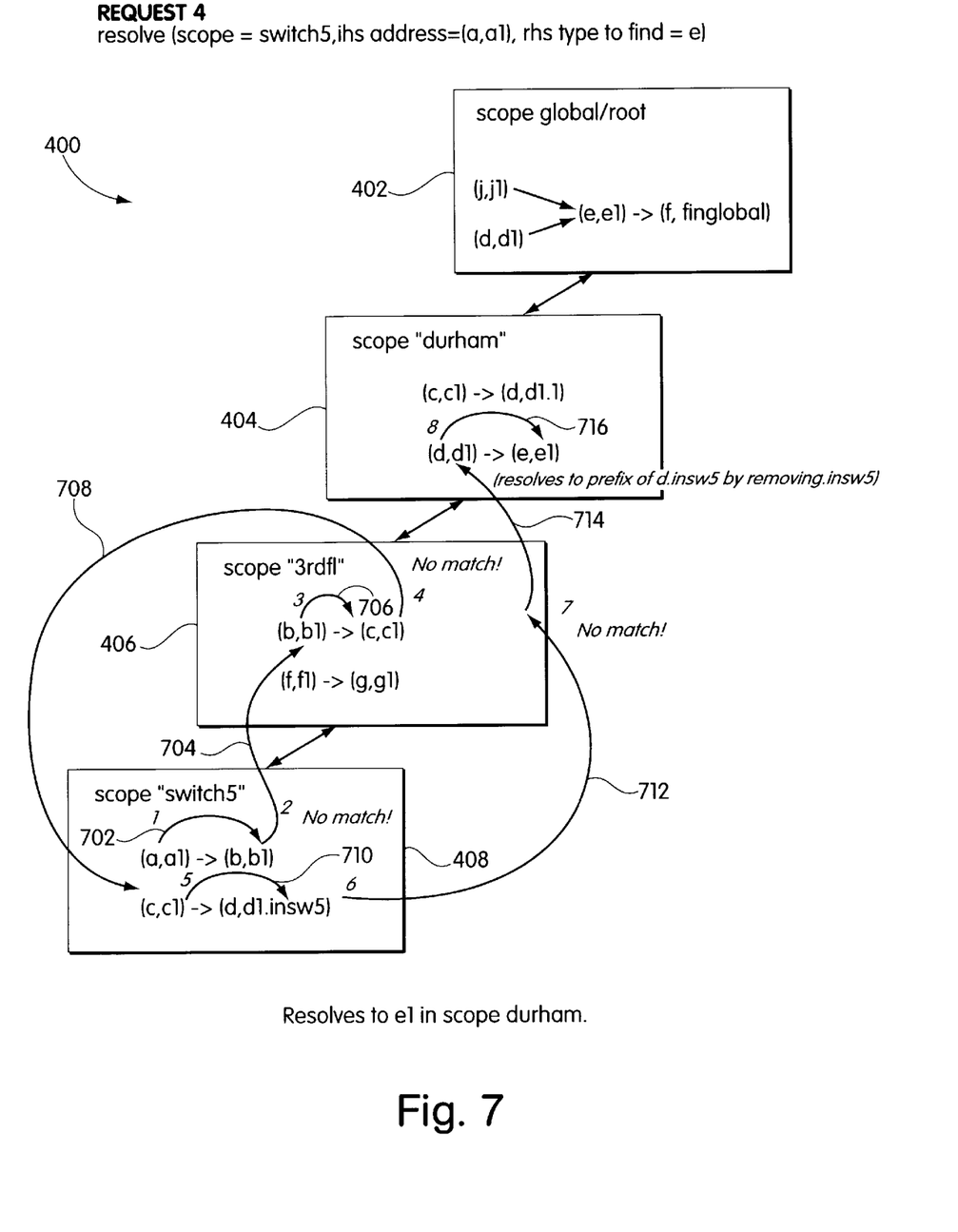

As shown in FIG. 7, the hierarchical directory (tree structure) 400 is the same as that of FIG. 4. Starting in "switch5" scope 408 there is no mapping of the address (a, a1) to an address with the type "e". Step 702 resolves address (a, a1) to address (b, b1) as an intermediate lhs tuple. Step 704 then moves to the next higher scope, "3rdfl" scope 406. The tuple (b, b1) is intermediately resolved to an address (c, c1) in the "3rdfl" scope 406 in step 706. Since the method always tries to resolve at the lowest scope level, step 708 moves back to scope 408. The intermediate address (c, c1) is checked in the "switch5" node 408 where a resolution, step 710, from address (c, c1) to address (d, d1.insw5) is performed. Since the desired type "e" is still not found, the search moves up to the "3rdfl" node 406, step 712, where there is also no mapping of the intermediate address (d, d1.insw5) to an address with a type of "e". Moving up to the next higher hierarchical "durham" scope 404, step 714, there is no mapping for the intermediate address (d, d1.insw5). There is, however, a mapping for the address (d, d1). As between the address (d, d1.insw5) and the address (d, d1), they have the same type, i.e., "d", and the values have the same prefix, i.e., "d1". A mapping of address (d, d1) to (e, e1) is present in "durham" scope 404. In step 716, intermediate address (d, d1) is resolved to address (e, e1) based on the common "d1" prefix. As a result, the address of (a, a1) in scope "switch5" resolves to an address (e, e1) in the "durham" scope.

For each instance that a particular lhs address is mapped to an rhs address which is not of the desired type, the method goes back to the lowest scope in the hierarchical directory structure from which the present resolve request has originated. Consider the following resolution request:

resolve (scope=switch5, lhs address=(a, a1), rhs type to find=f). (5)

Figure 8:
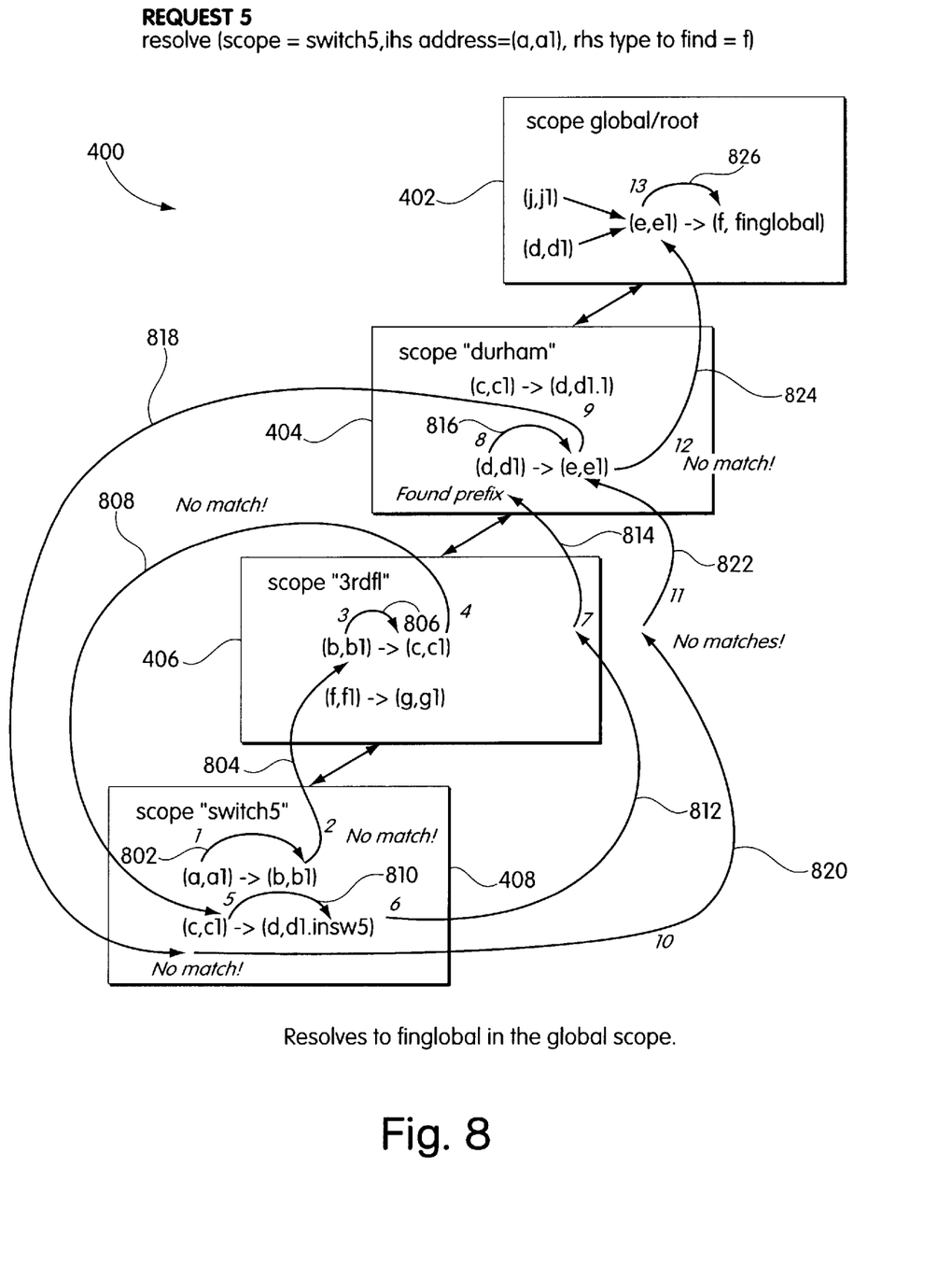

As shown in FIG. 8, the above resolution request is implemented in the same hierarchical directory (tree structure) 400 as found in FIG. 4. Starting in the "switch5" scope 408, the method looks for a mapping of address (a, a1) to an address tuple having a type of "f". There is no such mapping, although there is a mapping of the (a, a1) address to an address (b, b1). As a result, in step 802, an intermediate resolution resolves the address (a, a1) to intermediate address (b, b1). In step 804, the next higher level of hierarchy, i.e., "3rdfl" scope 406, is checked to see if there is a mapping from address (b, b1) to an address having a type of "f". Since such a mapping does not exist, step 806 intermediately resolves the address (b, b1) to the intermediate address (c, c1) and step 808 returns to the "switch5" scope 408.

There is no mapping for the address (c, c1) to the desired type, so in step 810 an intermediate resolution of the address (c, c1) to the address (d, d1.insw5) is performed. Step 812 moves to the next higher "3rdfl" scope 406 where there is no mapping of address (d, d1.insw5), so step 814 moves to the next higher "durham" scope 404. At this scope level, there is a mapping of the address (d, d1) to the address (e, e1). Relying on the common prefix between "d1.insw5" and "d1", step 816 intermediately resolves to the address (e, e1).

Returning to the lowest scope level, i.e., "switch5" scope 408, step 818 looks for a match but cannot find one, so in step 820 this search is done in the next higher scope level, i.e., "3rdfl" scope 406. Here, once again, there is no match, so step 822 moves to the "durham" scope 404. Again, there is no match so step 824 moves to the next highest level of "global/root" scope 402.

In scope 402, there is a mapping of the address (e, e1) to the address (f, finglobal). This latter address is an address of the desired type "f". Therefore, step 826 resolves the intermediate address (e, e1) to the address (f, finglobal). In the end, the result of resolution request set forth in (5) above is the address "finglobal" in the "global/roof" scope. It should be noted that although the mapping found in the hierarchal structure 400 at the "global/root" scope 402 was a series of mappings, the resolution functions in the direction of the mapping and, therefore, can be started at any point along the mapping. In this example, the mapping of the address (e, e1) to the address (f, finglobal) started at a point other than what might be considered a "starting point" of the mapping representation, i.e., tuple (j, j1).

Figure 9:
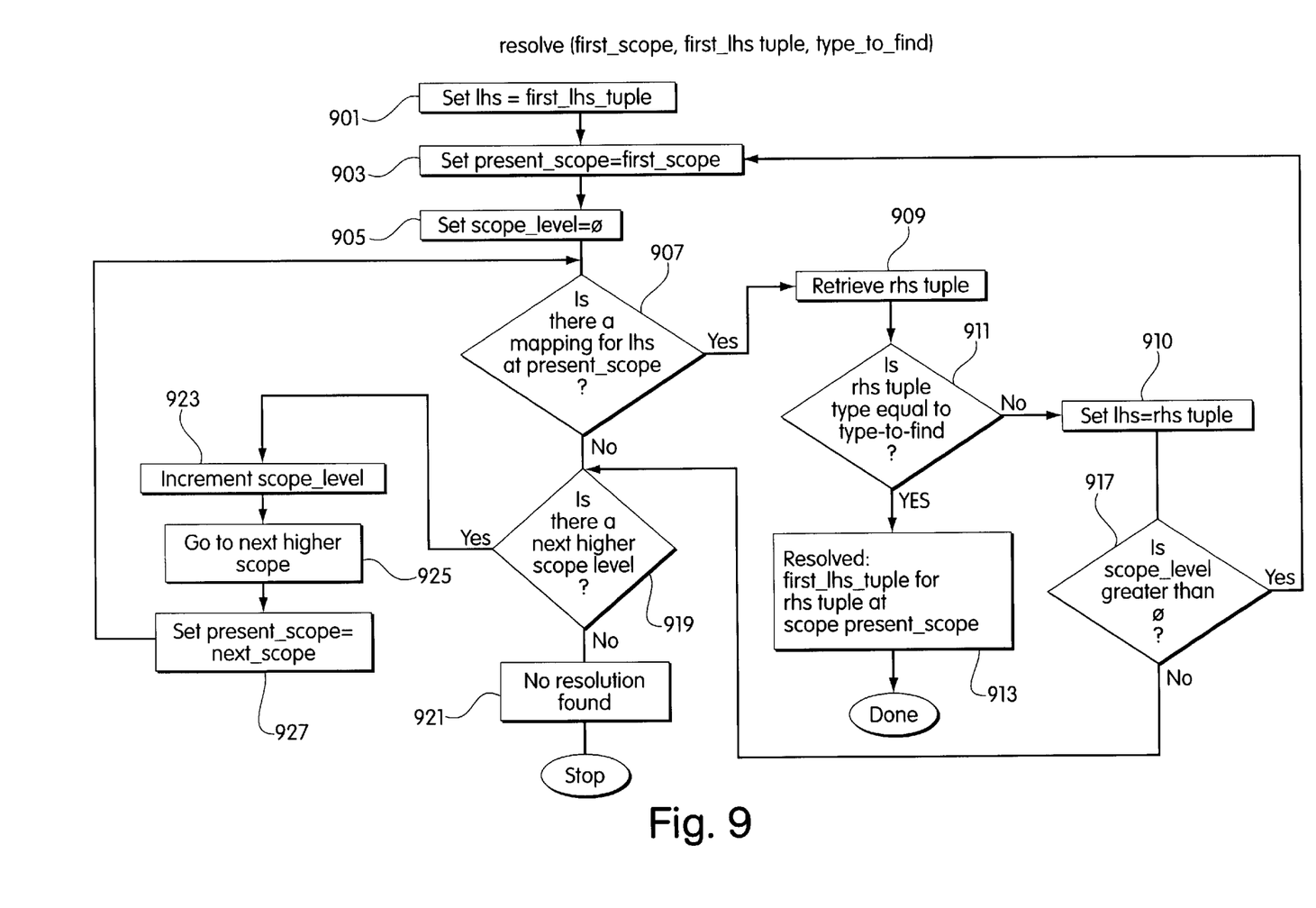
FIG. 9 is a flow chart also representing steps performed in resolving address resolution requests in a network according to the present invention.

As set forth in the flow chart of FIG. 9, the steps as described above with regard to FIGS. 4–8 are summarized therein.

Starting with a resolution request in the form of:

resolve (first_scope, first_Lhs_tuple, type_to_find) (6)

In step 901, a variable Lhs is set equal to first_Lhs_tuple, in step 903 a variable present_scope is set equal to first_scope, and in step 905 a variable scope_level is set equal to zero. In step 907, it is determined whether there is a mapping for variable Lhs at scope level present_scope. If there is a mapping found in step 907, control passes to step 909 where the rhs tuple is retrieved. At step 911, the determination is made as to whether or not the rhs tuple type is equal to the type_to_find. If this condition is true, control passes to step 913 where the resolution of the address is completed and it is reported that first_Lhs_tuple in first _scope resolves to rhs tuple at a scope level of present_scope.

Returning to step 911, if the rhs tuple type is not equal to type_to_find, then control passes to step 915 where the variable Lhs is set equal to rhs tuple. At step 917, it is determined whether or not the scope_level value is greater than zero. If scope_level is greater than zero, control returns to step 903.

If the determination of step 917 finds that the scope_level is not greater than zero, control passes to step 919. At step 919, it is determined if there is a next higher scope level. If there is not a next higher scope level, control passes to step 921 and a report that no resolution is found is returned. When, on the other hand, there is a next higher scope level, control passes from step 919 to step 923 where the variable scope_level is incremented and at step 925 the system moves to the next higher scope then at step 927, the variable present_scope is set equal to next_scope. Control then returns to step 907 where the analysis will begin again to determine if there is a mapping for the value to which the variable Lhs has been set.

As can be seen, the process as described by the flowchart in FIG. 9, will move back down to the first_scope level each time there is an intermediate mapping of an Lhs tuple to an rhs tuple which does not have an rhs tuple type equal to the type_to_find. In addition, if a resolution passed through the process does not result in finding an rhs tuple having an rhs tuple type equal to the type_to_find, then the next higher scope will be searched and an attempt to resolve the address resolution request will be made at that level.

It is clear that the process as set forth in FIG. 9 could be modified to limit the number of higher scopes which are searched in order to conserve processing resources. In addition, prefixes could be easily supported in this process, where at least steps 907 and 911 would be modified to equate and/or calculate prefixes. As disclosed by the specification above, this would be well within the abilities of one of ordinary skill in the art to incorporate.

The present invention is preferably implemented on a Virtual Networking Services System available from Cabletron Systems, Inc., Rochester, N.H., U.S.A.; this system includes a SunSparc 20 computer running the Solaris operating system. Of course, the present invention could be adapted to run on any set of communicating processes and/or processors appropriately connected to one another and each capable of performing the required functions.

Figure 10:
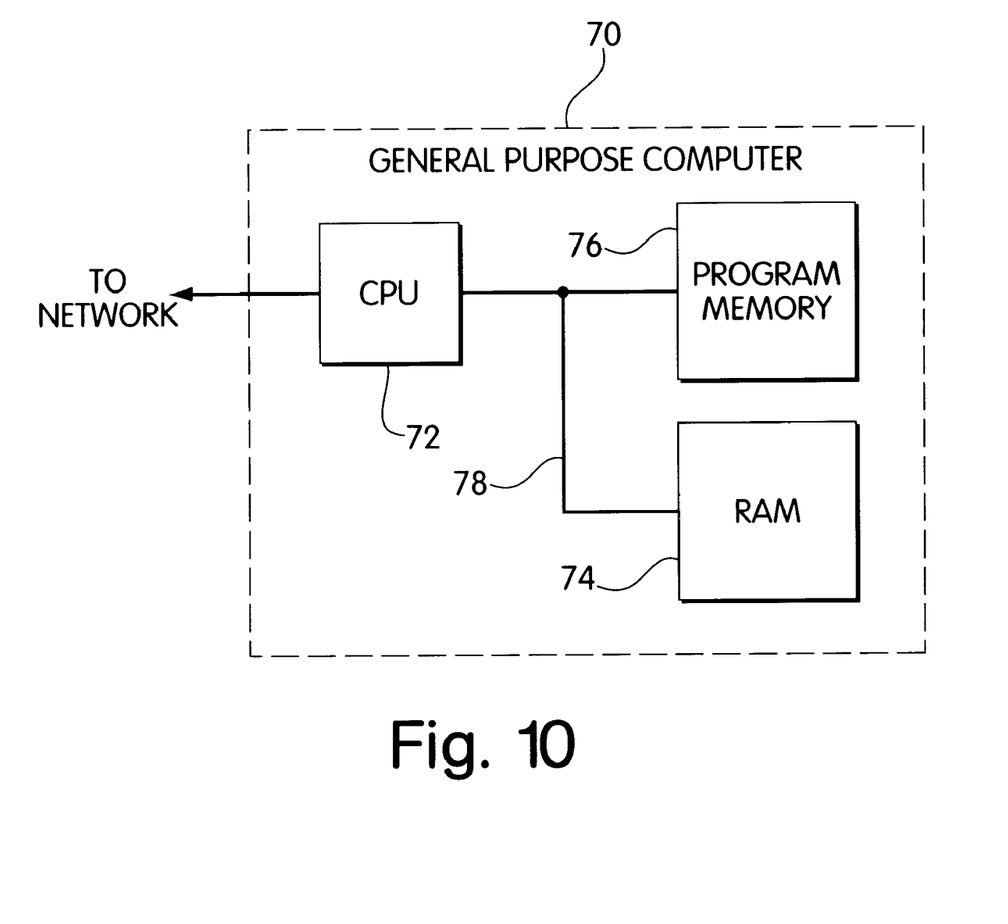
FIG. 10 shows a general purpose computer as one example of implementing the present invention.

The perspective-based shared scope system of the present invention may be implemented as software on a floppy disk, compact disc or hard drive which controls a computer, for example a general purpose computer such as a workstation, mainframe, or personal computer, to perform the steps of the processes disclosed in FIGS. 1–9. The software would then include a program having a data structure for providing general purpose computer instructions and data for carrying out the functions of the previous embodiments. Such a general purpose computer 70, as shown in FIG. 10, typically includes a central processing unit 72 (CPU) coupled to random access memory 74 (RAM) and program memory 76 via a data bus 78. The general purpose computer 70 may be connected to the network in order to receive and provide address mappings and resolutions to other devices on the network.

Alternately, the invention may be implemented as special purpose electronic hardware. Additionally, in either a hardware or a software embodiment, the functions performed by the different elements may be combined in various arrangements of hardware and software.

Having thus described various illustrative embodiments of the invention, various modifications will occur to those skilled in the art that are intended to be within the scope of the present invention. Thus, this description and accompanying drawings are provided by way of example and are not intended to be limiting. The invention is defined by the following claims.

What is claimed is:

1. A system for resolving a first address type and value to a target address type and value in a network, comprising a computer-readable medium encoded with:

a data structure comprising a hierarchical directory including a plurality of nodes in a tree structure, each node being a directory scope representing a respective hierarchical level within the network and each node having address mapping elements defining address mappings; and a plurality of executable methods including:

a method for attempting to resolve the first address type and value to the target address type and value as a function of the address mapping elements in a first node at a first hierarchical level.

2. The system as recited in claim 1, wherein the plurality of executable methods further comprises:

when the first address type and value cannot be resolved to the target address type and value in the first node, a method for attempting to resolve the first address type and value to a first intermediate address type and value as a function of the address mapping elements in the first node; and a method for attempting to resolve the first intermediate address type and value to the target type and value as a function of the address mapping elements in a second node at a second hierarchical level, higher than the first hierarchical level.

3. The system as recited in claim 2, wherein the plurality of executable methods further comprises:

when the first intermediate address type and value cannot be resolved to the target address type and value in the second node, a method for attempting to resolve the first intermediate address type and value to a second intermediate address type and value as a function of the address mapping elements in the second node; and a method for attempting to resolve the second intermediate address type and value to the target address type and value as a function of the address mapping elements in the first node.

4. The system as recited in claim 3, wherein the plurality of executable methods further comprises:

when the second intermediate address type and value cannot be resolved to the target address type and value in the first node, a method for attempting to resolve the second intermediate address type and value to a third intermediate address type and value as a function of the address mapping elements in the first node; and a method for attempting to resolve the third intermediate address type and value to the target address type and value as a function of the address mapping elements in the second node.

5. The system as recited in claim 4, wherein the plurality of executable methods further comprises:

when the third intermediate address type and value cannot be resolved to the target address type and value in the second node, a method for attempting to resolve the third intermediate address type and value to the target address type and value as a function of the address mapping elements in a third node at a third hierarchical level, the third hierarchical level being higher than the first and second hierarchical levels.

6. The system as recited in claim 5, wherein the method for attempting to resolve the third intermediate address type and value to the target address type and value as a function of the address mapping elements in the third node comprises:

a method for attempting to resolve the third intermediate address type and value to a fourth intermediate address type and value where the third intermediate value and the fourth intermediate value have a common prefix; and a method for attempting to resolve the fourth intermediate address type and value to the target address type and value.

7. The system as recited in claim 1, wherein the plurality of executable methods further comprises:

a method for attempting to resolve the first address type and value to the target address type and value as a function of the address mapping elements in a second node at a second hierarchical level higher than the first hierarchical level when the first address type and value cannot be resolved to the target address type and value as a function of the address mapping elements in the first node.

8. The system as recited in claim 1, wherein the plurality of executable methods further comprises:

a method for attempting to resolve the first address type and value to a first intermediate address type and value as a function of the address mapping elements in the first node when the first address type and value cannot be resolved to the target address type and value as a function of the address mapping elements in the first node; and a method for attempting to resolve the first intermediate address type and value to the target address type and value;

wherein the first intermediate address value and the target address value have a common prefix.

9. A method of resolving a first address type and value to a target address type and value in a system including a data structure comprising a plurality of address types and having address values mapped to one another in a hierarchical structure including at least a first hierarchical node at a first hierarchical level, each node representing a respective hierarchical level within the system, the method comprising the steps of:

(a) attempting to resolve the first address type and value to the target address type and value as a function of address values in the first hierarchical node; and (b) when the attempted resolution in step (a) is not successful at the first hierarchical node, attempting to resolve the first address type and value to an intermediate address type and value as a function of address values in the first hierarchical node; and (c) attempting to resolve the first intermediate address type and value to the target address type and value as a function of address values in a second hierarchical node at a second hierarchical level.

10. The method as recited in claim 9, further comprising the steps of:

when the first address type and value cannot be resolved to an intermediate address type and value in the first hierarchical node, attempting to resolve the first address type and value to a first intermediate address type and value as a function of address values in a second hierarchical node.

11. The method as recited in claim 10, wherein the step of attempting to resolve the first intermediate address type and value to the target address type and value as a function of the address values in the second hierarchical node includes the steps of:

when the first intermediate address type and value cannot be resolved to the target address type and value,
attempting to resolve the first intermediate address type and value to a second intermediate address type and value; and attempting to resolve the second intermediate address type and value to the target address type and value as a function of the address values in the first hierarchical node.

12. The method as recited in claim 11, wherein:

when the second intermediate address type and value cannot be resolved to the target address type and value in the first hierarchical node, attempting to resolve the second intermediate address type and value to the target address type and value as a function of the address values in the second hierarchical node.

13. A method of resolving a starting address type and value to a target address type and value in a system including a hierarchical directory including a tree structure, the tree structure including at least a starting hierarchical node at a starting hierarchical level, each hierarchical node including at least one address mapping set, and each hierarchical node representing a respective hierarchical level within the system, the method comprising the steps of:

(a) attempting to resolve the starting address type and value to the target address type and value as a function of the address mapping set in the starting hierarchical node;

(b) when the starting address type and value cannot be resolved to the target address type in step (a), performing one of the following steps:

(c) resolving the starting address type and value to a first intermediate address type and value as a function of the address mapping set in the starting node; and (d) attempting to resolve the starting address type and value to the target address type and value as a function of the address mapping set in a second hierarchical node at a second hierarchical level higher than the first hierarchical level.

14. The method as recited in claim 13, wherein:

(e) when the starting address type and value have been resolved to the first intermediate address type and value in step (c), attempting to resolve the first intermediate address type and value to the target address type and value as a function of the address mapping set in a second hierarchical node at a second hierarchical level higher than the starting hierarchical level; and (f) when the first intermediate address type and value cannot be resolved to the target address type and value in step (e), performing one of the following steps:

(g) resolving the first intermediate address type and value to a second intermediate address type and value as a function of the address mapping set in the second hierarchical node; and (h) attempting to resolve the first intermediate address type and value to the target address type and value as a function of the address mapping set in a third hierarchical node at a third hierarchical level higher than the second hierarchical node.

15. The method as recited in claim 14, wherein:

when the first intermediate address type and value have been resolved to the second intermediate address type and value in step (g), attempting to resolve the second intermediate address type and value to the target address type and value as a function of the address mapping set in the starting hierarchical node.

16. An apparatus for mapping a first address type and value to a second address type and value in a network, the apparatus comprising:

means for storing a plurality of address types and respective values mapped to one another; and first means for mapping the first address to the second address as a function of the stored address types and values, wherein the storing means comprise means for storing the address types and values in a hierarchical directory tree structure including at least a first hierarchical node at a first hierarchical level, and wherein the first hierarchical node represents a respective first hierarchical level of the network.

17. The apparatus as recited in claim 16, further comprising:

second means for mapping the first address type and value to the second address type and value in the first hierarchical node.

18. The apparatus as recited in claim 17, further comprising:

third means for mapping the first address type and value to a first intermediate address type and value when the second means for mapping cannot map the first address type and value to the second address type and value; and means for mapping the first intermediate address type and value to the second address type and value.

19. A computer-readable medium comprising:

a data structure comprising a hierarchical directory including a plurality of nodes in a tree structure, each node being a directory scope representing a respective hierarchical level within a network and having address mapping elements defining address mappings; and computer-executable instructions that, when executed by a computer, direct the computer to perform a method of resolving a first address type and value to a target address type and value in the network, the method including:

attempting to resolve the first address type and value to the target address type and value as a function of the address mapping elements in a first node at a first hierarchical level, wherein the first node is one of the plurality of nodes in the data structure.

20. The computer-readable medium as recited in claim 19, wherein the method further comprises:

if the first address type and value cannot be resolved to the target address type and value in the first node, attempting to resolve the first address type and value to a first intermediate address type and value as a function of the address mapping elements in the first node; and attempting to resolve the first intermediate address type and value to the target type and value as a function of the address mapping elements in a second node at a second hierarchical level, the second hierarchical level being higher than the first hierarchical level.

21. The computer-readable medium as recited in claim 20, wherein the method further comprises:

if the first intermediate address type and value cannot be resolved to the target address type and value in the second node, attempting to resolve the first intermediate address type and value to a second intermediate address type and value as a function of the address mapping elements in the second node; and attempting to resolve the second intermediate address type and value to the target address type and value as a function of the address mapping elements in the first node.

22. The computer-readable medium as recited in claim 21, wherein the method further comprises:

if the second intermediate address type and value cannot be resolved to the target address type and value in the first node, attempting to resolve the second intermediate address type and value to a third intermediate address type and value as a function of the address mapping elements in the first node; and attempting to resolve the third intermediate address type and value to the target address type and value as a function of the address mapping elements in the second node.

23. The computer-readable medium as recited in claim 22, wherein the method further comprises:

if the third intermediate address type and value cannot be resolved to the target address type and value in the second node, attempting to resolve the third intermediate address type and value to the target address type and value as a function of the address mapping elements in a third node at a third hierarchical level, the third hierarchical level being higher than the first and second hierarchical levels.

24. The computer-readable medium as recited in claim 23, wherein the attempting to resolve the third intermediate address type and value to the target address type and value as a function of the address mapping elements in the third node comprises:

attempting to resolve the third intermediate address type and value to a fourth intermediate address type and value where the third intermediate value and the fourth intermediate value have a common prefix; and attempting to resolve the fourth intermediate address type and value to the target address type and value.

25. The computer-readable medium as recited in claim 19, wherein the method further comprises:

attempting to resolve the first address type and value to the target address type and value as a function of the address mapping elements in a second node at a second hierarchical level higher than the first hierarchical level if the first address type and value cannot be resolved to the target address type and value as a function of the address mapping elements in the first node.

26. The computer-readable medium as recited in claim 19, wherein the method further comprises:

attempting to resolve the first address type and value to a first intermediate address type and value as a function of the address mapping elements in the first node if the first address type and value cannot be resolved to the target address type and value as a function of the address mapping elements in the first node; and attempting to resolve the first intermediate address type and value to the target address type and value;

wherein the first intermediate address value and the target address value have a common prefix.

* * * * *